(12) United States Patent
Brown

(10) Patent No.: US 11,734,314 B2
(45) Date of Patent: *Aug. 22, 2023

(54) SYSTEM AND METHOD FOR IDENTIFYING QUESTIONS OF USERS OF A DATA MANAGEMENT SYSTEM

(71) Applicant: Intuit Inc., Mountain View, CA (US)

(72) Inventor: Steven J. Brown, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/379,832

(22) Filed: Jul. 19, 2021

(65) Prior Publication Data

US 2021/0349921 A1 Nov. 11, 2021

Related U.S. Application Data

(63) Continuation of application No. 16/423,959, filed on May 28, 2019, now Pat. No. 11,170,026.

(51) Int. Cl.
*G06F 16/28* (2019.01)
*G06F 16/93* (2019.01)
*G06Q 40/12* (2023.01)

(52) U.S. Cl.
CPC .......... *G06F 16/285* (2019.01); *G06F 16/93* (2019.01); *G06Q 40/123* (2013.12)

(58) Field of Classification Search
CPC ....... G06F 16/285; G06F 16/93; G06N 5/022; G06N 3/0427; G06N 20/00
See application file for complete search history.

(56) References Cited

U.S. PATENT DOCUMENTS

| | | |
|---|---|---|
| 6,829,603 B1 | 12/2004 | Chai et al. |
| 10,803,248 B1 | 10/2020 | Arfa et al. |
| 10,958,599 B1 | 3/2021 | Penov et al. |
| 11,086,857 B1 | 8/2021 | Ganu et al. |
| 11,170,026 B1 | 11/2021 | Brown |
| 2008/0275834 A1 | 11/2008 | Zhong et al. |
| 2014/0325254 A1 | 10/2014 | Mani et al. |
| 2016/0063097 A1 | 3/2016 | Brown et al. |
| 2017/0177660 A1 | 6/2017 | Chang et al. |

(Continued)

FOREIGN PATENT DOCUMENTS

WO 2012024580 A1 2/2013

OTHER PUBLICATIONS

Bordawekar et al., "Using Word Embedding to Enable Semantic Queries in Relational Databases," DEEM '17, Chicago, IL, USA, 4-pages, May 12, 2017.

(Continued)

*Primary Examiner* — Hau H Hoang
(74) *Attorney, Agent, or Firm* — Paradice & Li LLP

(57) ABSTRACT

Systems and methods are disclosed. An example method may be performed by one or more processors of a system and include retrieving case data indicating, for each respective case of a number of cases, one or more documents retrieved to assist a system user associated with the respective case, generating, from the case data, a case matrix including a plurality of rows each corresponding to a respective case of the number of cases and a plurality of columns each corresponding to the documents retrieved to assist the system user associated with the respective case, and identifying groups of similar cases among the plurality of cases based on a clustering process performed on at least a portion of the case matrix.

20 Claims, 8 Drawing Sheets

(56) References Cited

U.S. PATENT DOCUMENTS

| | | |
|---|---|---|
| 2017/0337264 A1 | 11/2017 | Barbosa et al. |
| 2018/0032330 A9 | 2/2018 | Ryall et al. |
| 2018/0150552 A1 | 5/2018 | Wang |
| 2018/0240125 A1 | 8/2018 | Karuppasamy |
| 2019/0114321 A1 | 4/2019 | Lam et al. |
| 2019/0130415 A1 | 5/2019 | Cheah et al. |
| 2019/0138660 A1 | 5/2019 | White et al. |
| 2020/0065151 A1 | 2/2020 | Ghosh et al. |
| 2021/0081442 A1 | 3/2021 | Ganu et al. |
| 2021/0232948 A1 | 6/2021 | Otsuka et al. |

OTHER PUBLICATIONS

Deng et al., "Advanced Search System for IT Support Services," IBM J. Res. & Dev., vol. 61, No. 1, Paper 3, pp. 3:27-3:40 (2017).
Golovin et al., "Adaptive Submodularity: Theory and Applications in Active Learning and Stochastic Optimization," Journal of Artificial Intelligence Research 42 (2011), pp. 427-486, Jan. 2011.
Quarteroni et al., "A Chatbot-Based Interactie Questions Answering System," Decalog 2007: Proceedings of the 11th Workshop on the Semantics and Pragmatics of Dialogue, pp. 83-90, Trento, Italy, May 30-Jun. 1, 2017.
Yano et al., "Quantifying Query Ambiguity with Topic Distributions," Proceedings of the 25th ACM International Conference on Information and Knowledge Management, pp. 1877-1880, ACM, Oct. 24-28, 2016.
Zamani et al., "Embedding-Based Query Language Models," ICTIR '16, Newark, DE, USA, pp. 147-156, Sep. 12-16, 2016.
Zamani et al., "Relevance-Based Word Embedding," in proceedings of SIGIR '17, Aug. 7-11, 2017, Shinjuku, Tokyo, Japan, 10-pages.
Zhou et al., "SPARK: Adapting Keyword Query to Semantic Search," K. Aberer et al., (Eds.): ISWC/ASWC 2007, LNCS 4825, pp. 694-707, 2007.

|         | DOC 1 | DOC 2 | DOC 3 | DOC 4 | DOC 5 |     | DOC N-1 | DOC N |
|---------|-------|-------|-------|-------|-------|-----|---------|-------|
| CASE ID 1 | 0 | 0 | 0 | 0 | 1 | ... | 1 | 1 |
| CASE ID 2 | 0 | 1 | 0 | 0 | 0 | ... | 1 | 0 |
| CASE ID 3 | 1 | 0 | 0 | 1 | 0 | ... | 1 | 1 |
| CASE ID 4 | 0 | 0 | 1 | 0 | 0 | ... | 1 | 0 |
| CASE ID 5 | 1 | 0 | 0 | 1 | 0 | ... | 0 | 1 |
| CASE ID 6 | 0 | 0 | 0 | 0 | 1 | ... | 1 | 1 |
| CASE ID 7 | 0 | 0 | 0 | 0 | 0 | ... | 1 | 0 |
| CASE ID 8 | 1 | 0 | 0 | 0 | 1 | ... | 0 | 0 |
| ⋮ | ⋮ | ⋮ | ⋮ | | | | ⋮ | |
| CASE ID M-1 | 0 | 1 | 0 | 0 | 0 | ... | 0 | 1 |
| CASE ID M | 0 | 0 | 1 | 0 | 0 | ... | 0 | 1 |

FIG. 3

|  | COL 1 | COL 2 | COL 3 | COL 4 | COL 5 |
|---|---|---|---|---|---|
| CASE ID 1 | 0 | 1 | 0 | 0 | 1 |
| CASE ID 2 | 0 | 1 | 0 | 0 | 1 |
| CASE ID 3 | 1 | 0 | 0 | 1 | 0 |
| CASE ID 4 | 0 | 1 | 0 | 0 | 1 |
| CASE ID 5 | 1 | 0 | 0 | 1 | 0 |
| CASE ID 6 | 0 | 0 | 0 | 0 | 1 |
| CASE ID 7 | 0 | 0 | 1 | 0 | 0 |
| CASE ID 8 | 1 | 0 | 0 | 1 | 0 |
| ⋮ | ⋮ | ⋮ | ⋮ | ⋮ | ⋮ |
| CASE ID M-1 | 0 | 1 | 0 | 0 | 0 |
| CASE ID M | 0 | 0 | 1 | 0 | 0 |

FIG. 4

|  | GROUP 1 | GROUP 2 | GROUP 3 | GROUP 4 | GROUP 5 |
|---|---|---|---|---|---|
| CASE ID 1 | 1 | 0 | 0 | 0 | 0 |
| CASE ID 2 | 1 | 0 | 0 | 0 | 0 |
| CASE ID 3 | 0 | 1 | 0 | 0 | 0 |
| CASE ID 4 | 1 | 0 | 0 | 0 | 0 |
| CASE ID 5 | 0 | 1 | 0 | 0 | 0 |
| CASE ID 6 | 0 | 0 | 1 | 0 | 0 |
| CASE ID 7 | 0 | 0 | 0 | 1 | 0 |
| CASE ID 8 | 0 | 1 | 0 | 0 | 0 |
| ... | ... | ... | ... | ... | ... |
| CASE ID M-1 | 0 | 0 | 0 | 0 | 1 |
| CASE ID M | 0 | 0 | 0 | 0 | 1 |

FIG. 5

SYSTEM AND METHOD FOR IDENTIFYING QUESTIONS OF USERS OF A DATA MANAGEMENT SYSTEM

CROSS-REFERENCE TO RELATED APPLICATION

This patent application is a continuation of, and claims priority to, U.S. patent application Ser. No. 16/423,959 entitled "SYSTEM AND METHOD FOR IDENTIFYING QUESTIONS OF USERS OF A DATA MANAGEMENT SYSTEM" and filed on May 28, 2019, now U.S. Pat. No. 11,170,026, which is assigned to the assignee hereof. The disclosures of all prior applications are considered part of and are incorporated by reference in this patent application.

TECHNICAL FIELD

This disclosure relates generally to data management systems, and specifically to identifying questions of users of a data management system.

BACKGROUND

Millions of people turn to electronic data management systems for assistance in managing various kinds of data. Electronic data management systems represent a potentially efficient and convenient way to manage data of many kinds. For example, millions of people turn to data management systems for assistance with tax return preparation, bookkeeping, accounting, and transaction monitoring.

Users of data management systems often develop questions regarding features of the data management systems or related to data management topics. Accordingly, many traditional data management systems retain a library of assistance documents related to various assistance topics. Each assistance document includes an explanation regarding a feature of the data management system or regarding a data management topic. Typically, users access the assistance documents to obtain help related to various topics while using the data management systems.

In many cases, users are either unable to find assistance documents that answer their questions, or they do not attempt to search for appropriate assistance documents. In these cases, the users often contact customer support agents to assist in answering their questions. The customer support agents typically speak with the users and retrieve one or more assistance documents from the assistance document database in order to assist the users.

If a data management system could accurately determine what questions are driving the users to contact customer support, then the data management system could take measures to better assist users before they contact customer support agents. Merely polling customer support agents for this information can be difficult due to the large number of agents and the large volume of calls. Furthermore, making useful sense of this information can be difficult.

Some traditional data management systems have sought to group user questions at a fine-grained level. However, this problem is very challenging. One possible approach is to perform clustering on course-level metadata such as general case problem category. Another possible approach is to perform unsupervised clustering on free text associated with a call, such as on customer support agent notes or call transcripts to achieve finer-level groups. However, both of these approaches do not yield satisfactory results and are resource intensive.

Accordingly, traditional data management systems continue to provide inefficient customer self-help. When data management systems are not able to identify and address the exact types of questions that continue to drive customer support calls and customer searches among assistance topics databases, both the data management system and the users can face adverse consequences. Users continue to search among assistance documents and call customer support agents, thereby causing the data management systems to spend large amounts of human and computing resources, such as processor cycles, memory, and time performing searches for assistance topics.

All of these drawbacks are a result of the technical inability of the traditional data management systems to properly group customer assistance calls at a sufficiently fine-grained level that the driving factors for customer support calls can be accurately identified. Accordingly, there exists a technical problem of accurately grouping customer assistance calls in a fine-grained manner.

What is needed is a system and method that can provide a technical solution to the technical problem of accurately grouping customer assistance calls in a fine-grained manner.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method performed by one or more processors of a system. An example method may include retrieving case data indicating, for each respective case of a number of cases, one or more documents retrieved to assist a system user associated with the respective case, generating, from the case data, a case matrix including a plurality of rows each corresponding to a respective case of the number of cases and a plurality of columns each corresponding to the documents retrieved to assist the system user associated with the respective case, and identifying groups of similar cases among the plurality of cases based on a clustering process performed on at least a portion of the case matrix.

In some implementations, the method may further include generating a reduced matrix from the case matrix based on a truncated singular value decomposition process including a latent semantic analysis process, where the clustering process is performed on the reduced matrix. In some aspects, the reduced matrix has a same number of rows as the case matrix, and where the reduced matrix has fewer columns than the case matrix. In some aspects, each row of the reduced matrix corresponds to a respective case of the plurality of cases. In some instances, each row of the reduced matrix is a vector representing the respective case corresponding to the row. In some implementations, the clustering process groups cases based on vector similarity. In some aspects, the clustering process includes at least one of an agglomerative clustering process or performing cosine similarity calculations on vectors.

In some other implementations, the method may further include maintaining a database including the one or more documents, where each of the one or more documents includes information about the system, and where the one or more documents are retrieved from the database by system agents to assist system users. In some implementations, the method may further include identifying one or more common topics associated with the groups of similar cases. In some aspects, the method may further include adjusting a system user experience based on the one or more common topics.

Another innovative aspect of the subject matter described in this disclosure can be implemented in a system. An example system may include one or more processors and a memory storing instructions for execution by the one or more processors. Execution of the instructions may cause the system to perform operations including retrieving case data indicating, for each respective case of a number of cases, one or more documents retrieved to assist a system user associated with the respective case, generating, from the case data, a case matrix including a plurality of rows each corresponding to a respective case of the number of cases and a plurality of columns each corresponding to the documents retrieved to assist the system user associated with the respective case, and identifying groups of similar cases among the plurality of cases based on a clustering process performed on at least a portion of the case matrix.

In some implementations, execution of the instructions may further cause the system to perform operations including generating a reduced matrix from the case matrix based on a truncated singular value decomposition process including a latent semantic analysis process, where the clustering process is performed on the reduced matrix. In some aspects, the reduced matrix has a same number of rows as the case matrix, and where the reduced matrix has fewer columns than the case matrix. In some aspects, each row of the reduced matrix corresponds to a respective case of the plurality of cases. In some instances, each row of the reduced matrix is a vector representing the respective case corresponding to the row. In some implementations, the clustering process groups cases based on vector similarity. In some aspects, the clustering process includes at least one of an agglomerative clustering process or performing cosine similarity calculations on vectors.

In some other implementations, execution of the instructions may further cause the system to perform operations including maintaining a database including the one or more documents, where each of the one or more documents includes information about the system, and where the one or more documents are retrieved from the database by system agents to assist system users. In some implementations, execution of the instructions may further cause the system to perform operations including identifying one or more common topics associated with the groups of similar cases. In some aspects, execution of the instructions may further cause the system to perform operations including adjusting a system user experience based on the one or more common topics.

Another innovative aspect of the subject matter described in this disclosure can be implemented as a non-transitory computer-readable medium storing instructions that, when executed by one or more processors of a system, cause the system to perform operations. Example operations may include retrieving case data indicating, for each respective case of a number of cases, one or more documents retrieved to assist a system user associated with the respective case, generating, from the case data, a case matrix including a plurality of rows each corresponding to a respective case of the number of cases and a plurality of columns each corresponding to the documents retrieved to assist the system user associated with the respective case, and identifying groups of similar cases among the plurality of cases based on a clustering process performed on at least a portion of the case matrix.

In some implementations, a data management system may keep track of how customer support agents handle customer support cases. The data management system may store data related to how each support case was handled. The data management system may arrange the data and then perform a combination of mathematical processes on the data in order to group the support cases together based on the support cases were handled. In resolving a support case, a support agent may often access one or more assistance documents that provide explanations regarding an aspect of the data management system. The data management system may automatically record which assistance documents were accessed by support agents in each support case. The data management system may generate a support case matrix that indicates, for each support case, the assistance documents that were accessed for that support case. The data management system may process the support case matrix with a process that reduces the size of the matrix. The data management system may then perform a clustering process on the reduced matrix. The clustering process may generate groups of similar support cases based on the assistance documents accessed during those support cases. After the support cases have been grouped, the data management system may identify the largest groups of similar support cases. The data management system may then identify the precise common topics in the largest groups of support cases. These common topics may correspond to the primary factors that cause the most users to contact support agents. When the data management system understands the specific topics that lead to most customer support calls, the data management system may take steps to better address these questions before users contact customer support.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale. One skilled in the art will readily recognize that the below figures are examples and that other architectures, modes of operation, orders of operation, and elements/functions can be provided and implemented without departing from the characteristics and features of the invention, as set forth in the claims.

FIG. 3 is a representation of support case matrix, according to an embodiment.

FIG. 4 is a representation of reduced matrix, according to an embodiment.

FIG. 5 is a representation of support case grouping data, according to an embodiment.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Figure 1:
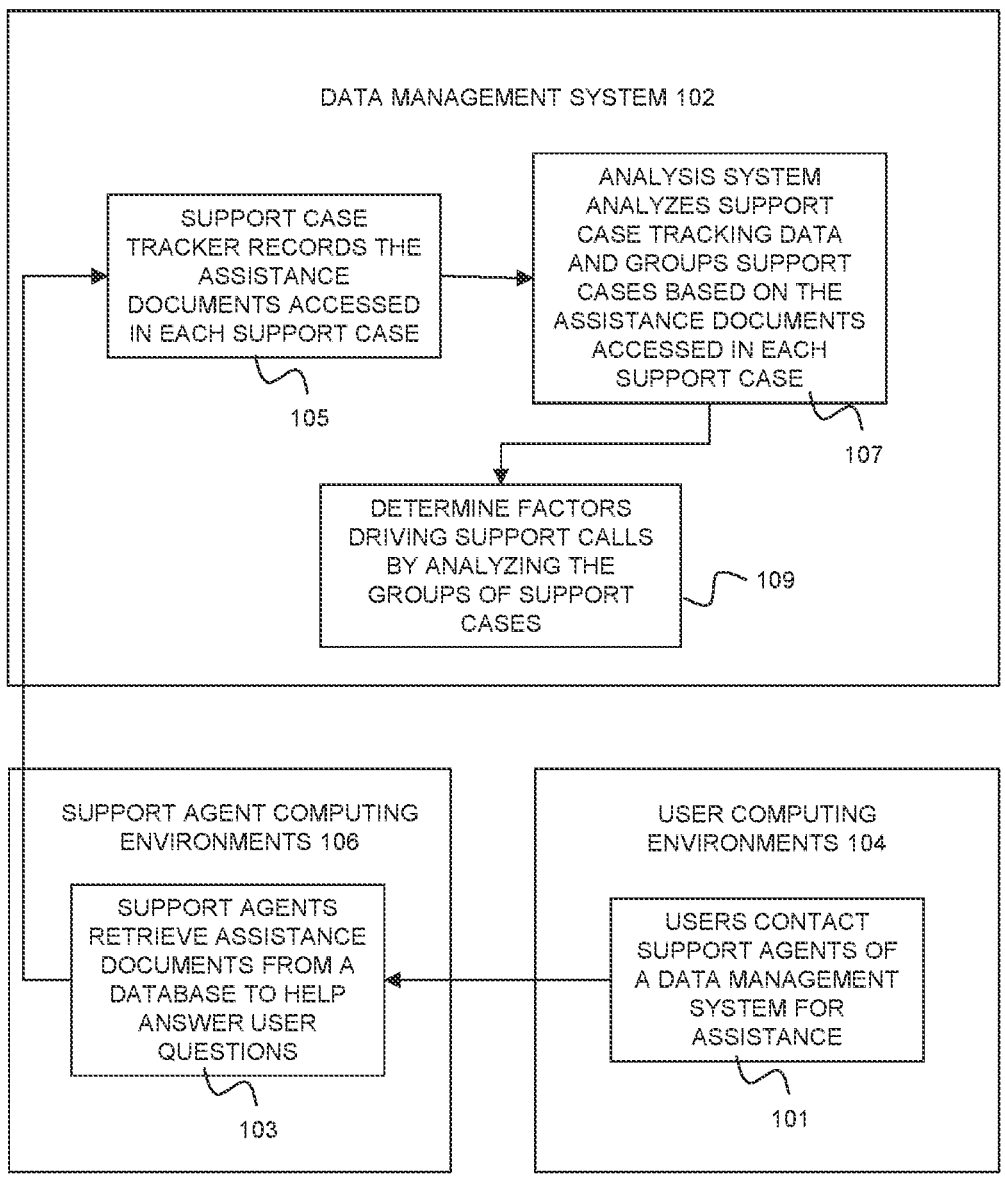
FIG. 1 illustrates a functional flow diagram of a process for determining driving factors for user support requests in a data management system, according to an embodiment.

FIG. 1 illustrates a functional flow diagram of a process 100 for determining driving factors for user support requests in a data management system. Users of a data management system, such as a tax return preparation system, sometimes contact support agents for assistance with an aspect of the data management system. The support agents access assistance documents to help resolve the users' concerns. The data management system tracks which support documents are accessed in each support case. The data management system then employs an analysis system to group the support cases based on the assistance articles accessed in each support case.

The process 100 can involve a data management system 102, user computing environments 104, and support agent computing environments 106.

At 101, users of a data management system 102 contact support agents of the data management system 102 for assistance. The users contact the support agents because, in the course of utilizing the data management system 102, some users develop questions or concerns about an aspect or feature of the data management system 102. If the users are not able to quickly arrive at a solution on their own, the users may contact support agents of the data management system 102.

Typically, the users contact the support agents from the user computing environments 104. The user computing environments 104 include the computing resources by which users access the data management system 102. Thus, the user computing environments 104 can include the devices and systems utilized by the users to contact the data management system 102.

The support agents can include individuals that are employed by the data management system 102 specifically to assist users to resolve questions and concerns. The support agents typically are individuals with an advanced knowledge of the functions of the data management system 102. The support agents are trained to assist in resolving the questions and concerns of users of the data management system.

When a support agent receives a support call from a user of the data management system 102, the support agent will attempt to answer the question of the user. In some cases, the support agent may know the answer to the user's question without the need to reference any additional material. However, in many cases, the support agent may need to access additional information in order to assist in answering the user's questions.

Accordingly, support agents have access to a database of assistance documents. Each assistance document is associated with an aspect of the data management system 102. Many of the assistance documents are generated in response to specific questions previously asked by users of the data management system 102. The support agents can access these assistance documents in order to gain additional information to assist users in resolving their questions.

At 103, support agents retrieve assistance documents from a database of assistance documents to help answer user questions. In a single support case in which a support agent assists a user in resolving a concern or question, the support agent may access multiple assistance documents. The support agent searches among the assistance document database for one or more assistance documents that can provide information to resolve the concern or question.

At 105, the data management system 102 tracks the assistance documents that are accessed in each support case. For this purpose, the data management system 102 includes a support case tracker. When a user contacts a support agent, the support agent opens a support case. The support case is assigned an identification number. When the support agent accesses an assistance document in connection with the support case, the support case tracker writes data indicating that the assistance document was accessed in connection with the support case. In one embodiment, the data management system automatically generates a support case when the user contacts a support agent.

At 107 the data management system 102 utilizes an analysis system to analyze the support case data. In particular, the analysis system of the data management system 102 performs various process steps to group the support cases based on the assistance documents that were accessed to the support case. The data management system 102 can utilize the support case grouping data to better understand what types of questions or concerns are driving users to contact support agents.

Prior to performing analysis on the support case data, the analysis system can organize the support case data into a support case table. The support case table can include a plurality of rows each corresponding to a particular support case. The support case table can include a plurality of columns each corresponding to a particular assistance document.

The analysis system can convert the support case table into a support case matrix. The support case matrix includes rows representing support cases and columns representing assistance documents. A value in a data field corresponding to a particular row and column indicates whether the assistance document represented by the column was accessed in the support case represented by the row.

The assistance document database may include an extremely large number of assistance documents. Many of the assistance documents are redundant with each other. Some are duplicates, while others merely answer the same questions in slightly different ways. Due to the large number of assistance documents, the support case matrix can be extremely large.

Accordingly, before grouping the support cases, the analysis system can generate a reduced matrix from the support case matrix by performing a matrix reduction process on the support case matrix. The matrix reduction process can include reducing the number of columns in the reduced matrix compared to the support case matrix.

After the analysis system has generated the reduced matrix, the analysis system can group the support cases by analyzing the reduced matrix. Because the reduced matrix has a reduced number of columns compared to the support case matrix, the analysis system can more easily group of support cases from the reduced matrix. The analysis system groups the support cases based support articles that are associated with the support case.

At 109, the data management system determines the factors that most commonly drive users to contact support agents. The support case groupings can provide an indication regarding the major factors driving users to call support agents. The groups of support cases that include the largest numbers of support cases are indicative of the factors that drive the most users to call support agents. In particular, the assistance documents associated with the largest groups of support cases indicate what are the major driving factors for users to call support agents. The topics of these assistance documents correspond to the major driving factors for users to contact support agents.

The data management system 102 can perform many useful actions based on the support case groupings. When the data management system 102 has determined what are the major factors that drive users to contact the user support agents, the data management system 102 can take steps to address those topics before users contact support agents. For example, the data management system 102 can provide better explanations, clearer instructions, or more obvious callouts to assistance documents related to those topics so that users will not become confused and contact support agents to request assistance regarding those topics.

Figure 2:
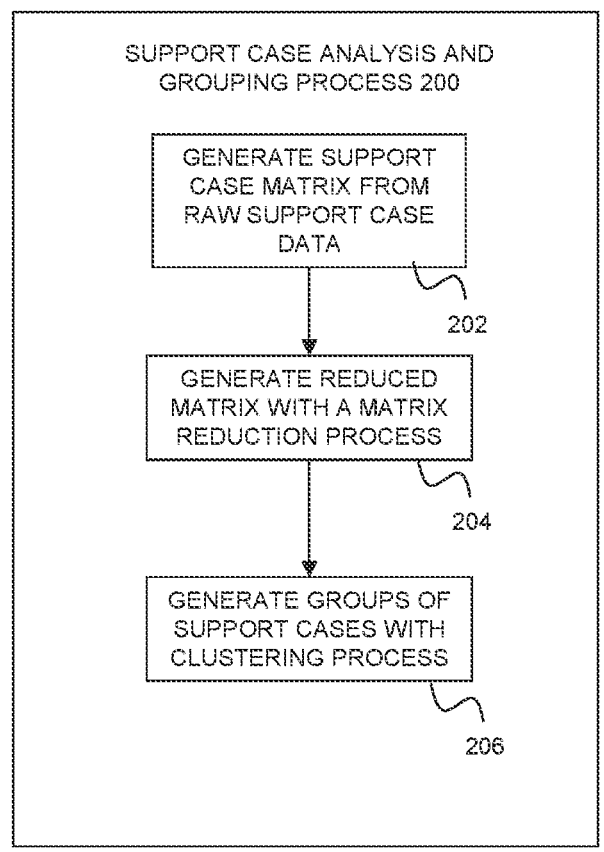
FIG. 2 illustrates a flow diagram of a process for grouping support cases in a data management system, according to an embodiment.

FIG. 2 is a flow diagram of a support case analysis and grouping process 200. The support case analysis and grouping process 200 of FIG. 2 is one embodiment of operation 107 of FIG. 1. In particular, an analysis system of the data management system 102 can perform the operations of the support case analysis and grouping process 200.

At 202, the analysis system generates a support case matrix from support case data. The support case data is collected by a support case tracker and includes, for each of a plurality of support cases, an identification of the assistance documents that were accessed by a support agent during the course of the support case. The analysis system organizes the raw support case data into the support case matrix. FIG. 3 shows an example of a support case matrix.

As described above, the support case matrix includes data organized in rows and columns. Each row corresponds to a respective support case. The rows can be organized by support case ID numbers. Each column corresponds to a respective assistance document. The columns can be arranged by assistance document ID numbers.

The support case matrix includes a plurality of data fields. Each data field corresponds to the intersection of a support case and an assistance document. Each data field is populated with a data value. The data value in a given data field indicates whether the corresponding assistance document was accessed by a support agent in the corresponding support case.

At 204, the analysis system generates a reduced matrix from the support case matrix. The reduced matrix is generated by performing a matrix reduction process on the support case matrix. The reduced matrix has a reduced dimensionality with respect to the support case matrix. The reduced dimensionality enables more efficient processing of the reduced matrix in order to generate groups of support cases. FIG. 4 shows an example of a reduced case matrix.

The matrix reduction process can result in a reduced matrix that has the same number of rows, but a reduced number of columns. Thus, each row of the reduced matrix corresponds to a respective support case. However, the columns of the reduced matrix no longer correspond to individual assistance documents. Because each column does not correspond to a single assistance document, but rather an amalgamation of several columns of assistance documents, the reduced matrix can have a significantly smaller number of columns than the support case matrix.

The matrix reduction process can include a truncated singular value decomposition process. In the truncated singular value decomposition process, an expert selects a desired number t of reduced columns for the reduced matrix. The analysis system then computes the singular value decomposition for the support case matrix. If the support case matrix [C] is an M×N matrix (i.e., has M rows and N columns), then the singular value decomposition of [C] is a matrix [A] defined by the relationship $$[A]=[U]*[S]*[V],$$

where [U] and [V] are orthogonal matrices containing the singular column and row vectors of [C] respectively, and where [S] is a matrix including the diagonal matrix containing the singular values of [A]. A truncated approximation of [A] having a reduced number of columns can be found by setting all but the first t largest singular values equal to zero and using only the first t column vectors of [U] and [V]. The reduced matrix corresponds to the truncated approximation of [A]. In this way, a truncated singular value decomposition process can be utilized to generate the reduced matrix.

The truncated singular value decomposition process can include a latent semantic analysis process. The original support case matrix can be a sparse matrix. For example, while there may be many thousands of assistance documents, a single support case will most likely access fewer than five assistance documents. In this case, if a data value of 1 corresponds to an assistance document being accessed in a support case, and a data value of 0 corresponds to an assistance document not being accessed in a support case, then there will be a very large number of 0's in each row of the support case matrix. The latent semantic analysis process significantly reduces the number of columns in the reduced matrix.

The latent semantic analysis process performs advanced linear algebra operations on the support case matrix. Each support case matrix can correspond to a series of row vectors. Each row vector is a vector indicating, for a given support case, the assistance documents that were accessed in the support case. The latent semantic analysis process greatly reduces the number of data values in each row vector based on the advanced linear algebra operations that define latent semantic analysis process.

At 206, the analysis system generates groups of support cases based on the reduced matrix. In particular, the analysis system performs a clustering process on the reduced matrix. The clustering process identifies groups of support cases that are similar to each other based on the reduced matrix.

In the reduced matrix, each support case is represented by a row vector of reduced length compared to the row vectors in the support case matrix. Where the support case matrix may have had thousands of columns, the reduced matrix may have fewer than 50 columns. Each support case vector has a length corresponding to the number of columns in the reduced matrix. The clustering process can cluster or group the support cases based on the similarities of their vectors in the reduced matrix.

In one example, the clustering process includes an agglomerative clustering process. In the agglomerative clustering process, each support case vector is initially treated as a cluster. The process then computes the similarities between the vectors and combines into groups those vectors that are most similar to each other. The similarities can be calculated based on the cosine of the angles between the vectors.

The groups of support cases may have different numbers of support cases from each other. Some groups may have only one or two support cases. The largest groups may have dozens or hundreds of support cases. These groupings can be utilized to improve the data management system 102.

In one example, the data management system can identify which groups of support cases include the most support cases. The largest groups of support cases can provide an indication as to what are the key factors that drive the most users to call or otherwise contact support agents. Because the support cases are grouped based on the assistance documents accessed by support agents for those support cases, the groups are based on the topics of those assistance documents. In the example of tax return preparation system, topics could include entering W-2 data into tax return preparation system, itemizing deductions, claiming dependents, etc. Thus, the support cases are grouped by assistance document topics.

The data management system can select sample support cases from the larger groups of support cases. The data management system 102 can investigate the topics of the assistance documents accessed in the sample support cases. This gives a strong indication as to what are the key factors driving the largest numbers of users to contact the support agents. The data management system 102 can then take steps to ensure that users are better informed regarding these topics so that they will not contact support agents.

The data management system 102 is able to generate groups of support cases without the need of performing textual analysis on the assistance documents. Likewise, the data management system is able to generate groups of support cases without performing analysis on notes kept by support agents for the cases. Such textual analysis often includes natural language processing and optical character recognition. These processes can be highly resource intensive in terms of processing and memory resources. The matrix generation, the matrix reduction, and the final matrix-based grouping of the support cases, as disclosed herein, are relatively inexpensive in terms of computing resources. Accordingly, the support case analysis and grouping process 200 transforms computing systems into more efficient computing systems.

FIG. 3 is a representation of a support case matrix 300, according to one embodiment. The support case matrix 300 includes M rows and N columns. Each row represents an individual support case in which a user of the data management system 102 has contacted a support agent for assistance with an aspect of the data management system. Accordingly, in this example, there are M support cases. Each column of the support case matrix 300 represents an individual assistance document from a database of assistance documents.

The data fields of the support case matrix 300 indicate whether or not a given assistance document was accessed in connection with a support case. In the example of FIG. 3, the support agent in the first support case (case ID 1) accessed assistance document 5, assistance document N-1, and assistance document N, as indicated by the data values of 1 in these data fields. A data value of 0 in a data field indicates that an assistance document was not accessed in connection with that support case.

As set forth above, there can be many thousands of assistance documents. Accordingly, the value of N can be very high in the support case matrix 300.

FIG. 4 is a representation of a reduced matrix 400, according to one embodiment. The reduced matrix 400 is generated by performing a matrix reduction process on the support case matrix 300. As set forth above, the matrix reduction process can include a truncated singular value decomposition process, such as a latent semantic analysis process.

Each row in the reduced matrix 400 corresponds to an individual support case, as in the support case matrix 300. However, the columns of the reduced matrix 400 do not necessarily have a concrete meaning. The nature of the matrix reduction process is such that the columns of the reduced matrix may not correspond to simple groups or combinations of assistance documents, even though the columns are generated based on the assistance documents accessed in the support case. Alternatively, in some matrix reduction processes, the columns of the reduced matrix can correspond to groups of assistance documents.

To emphasize the reduced dimensionality of the reduced matrix 400, the reduced matrix 400 has only five columns. In practice, the reduced matrix 400 may include many more columns than five, but fewer than the support case matrix 300. Technicians or experts can select the number of columns for the reduced matrix. The matrix reduction process will then generate a reduced matrix with the selected number of columns.

While the reduced matrix 400 shows only values of 0 and 1 in the data fields, the data fields may include values other than 0 or 1. The matrix reduction process results in data fields that have data values between 0 and 1, and values greater than 1. In some cases, the data values can include negative numbers. The example of FIG. 4 includes only 0's and 1's for simplicity.

FIG. 5 is a representation of a support case grouping data 500, according to an embodiment. The support case grouping data 500 is generated from the reduced matrix 400. The analysis system of the data management system 102 performs a grouping or clustering algorithm on the reduced matrix 400 in order to generate groups of support cases. The support case grouping data 500 of FIG. 5 is a representation of the grouping of the support cases. The support case grouping data 500 can be a support case grouping matrix. In other cases, the grouping process performed on the reduced matrix 400 may not indicate grouping data in the form of a matrix.

The support case grouping process groups the support cases based on the assistance documents that were accessed in those support cases. The support case groups are generated based on the reduced matrix, which is generated from the support case matrix. Accordingly, the support cases are grouped based on the assistance documents that were accessed in those support cases.

In the example of FIG. 5, inclusion of a support case in a group is represented by a data value of 1 in the appropriate data field. It is indicated by a data value of 0. The first support case group includes support cases 1, 2, and 4. The second support case group includes support cases 3, 5, and 8. The third support case group includes support case 6. The fourth support case group includes support case 7. The fifth support case group includes support cases M-1 and M.

Though FIG. 5 shows five support case groups, in practice there can be many more support case groups than five.

Figure 6:
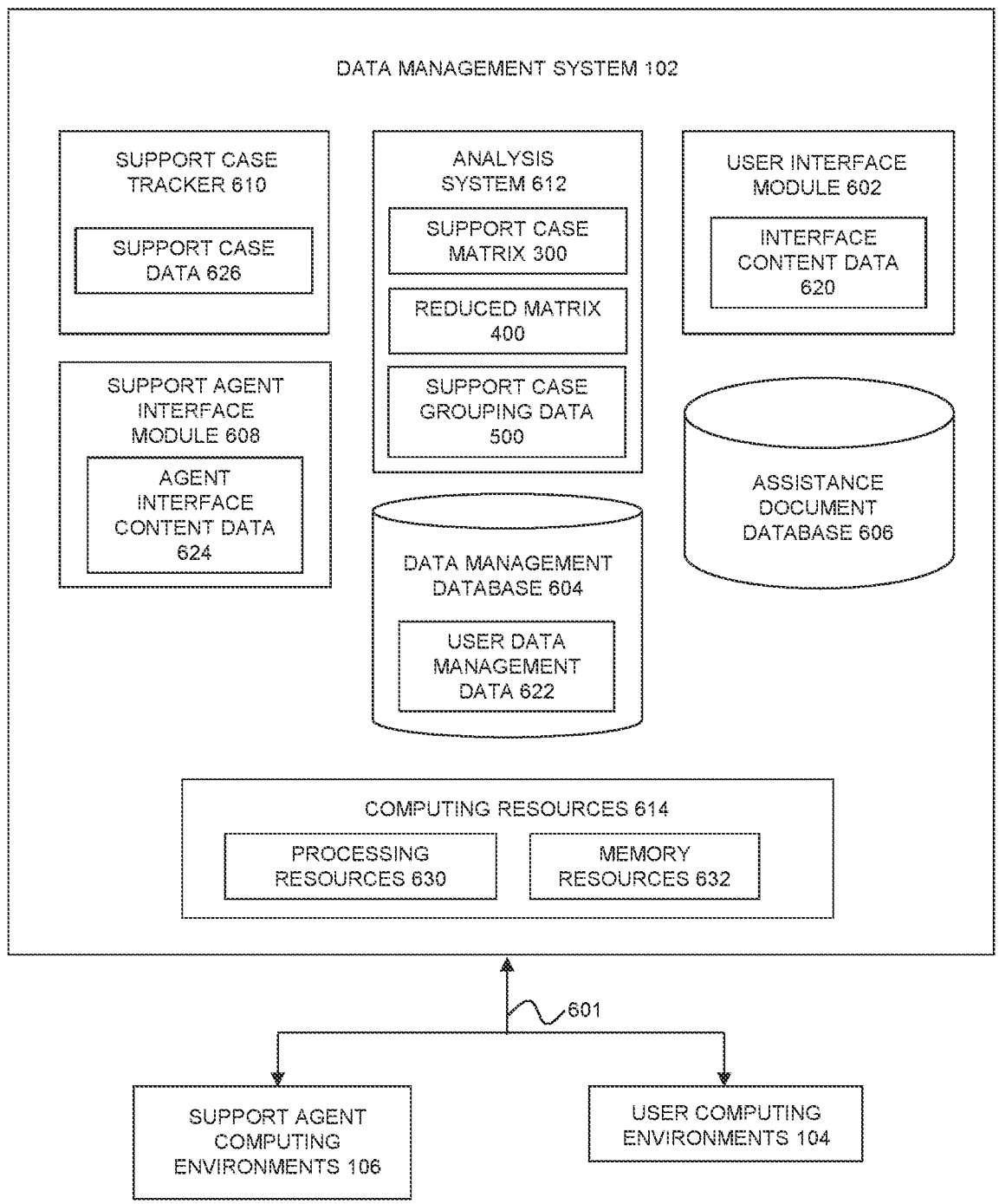
FIG. 6 is a block diagram of a data management system, according to an embodiment.

FIG. 6 is a block diagram of a production environment 600 including a data management system 102, according to an embodiment. The data management system 102 is an electronic data management system that assists users to manage their data. The data management system 102 can include one or more of a bookkeeping system, a tax return preparation system, an accounting system, and a financial transaction monitoring system, according to various embodiments. Users provide their data to the data management system and the data management system provides data management services to the users. The data management system 102 includes a user interface module 602, a user data management database 604, an assistance document database 606, a support agent interface module 608, a support case tracker 610, an analysis system 612, and computing resources 614.

The user computing environments 104 correspond to computing environments of the various users of the data management system 102. The users of the data management system 102 utilize the user computing environments 104 to interact with the data management system 102. The users of the data management system 102 can use the user computing environments 104 to provide data to the data management system 102 and to receive data and services, including data management services, from the data management system 102.

The user interface module 602 enables the users to communicate with the data management system 102. The user interface module 602 provides interface content data 620 to assist the user in managing the user's data. The interface content data 620 can include navigation menus and other graphical user interface (GUI) tools that enable the user to navigate the data management system 102 in order to receive data management services. The interface content data 620 can include data management data related to the user. Thus, the user interface module 602 enables the data management system 102 to provide data management services to the user.

The data management system 102 includes a user data management database 604. The user data management database 604 includes the user data management data 622. The user data management data 622 can include data management data for all of the users of the data management system. Thus, the user data management database 604 can include a vast amount of data related to the data management services provided to users. In one embodiment, when the user utilizes the user interface module 602 to view interface content data 620, the interface content data 620 includes user data management data 622 related to the user as retrieved from the user data management database 604.

While using the data management system, some users may have questions or concerns regarding aspects of the data management system. The questions or concerns can be related to particular functions of the data management system 102. The questions and concerns can also be related to the specific data management field associated with the data management system 102. For example, if the data management system 102 is a tax return preparation system, some of the users' questions may be related to tax law or the meaning of tax terms.

In order to enable users to resolve their concerns, the data management system 102 includes an assistance document database 606. The assistance document database 606 includes a plurality of assistance documents. Each assistance document is related to a particular aspect of the data management system about which users have previously asked questions. The assistance documents include solutions to problems, or explanations about aspects of the data management system 102. Users can search for answers among the assistance documents in the assistance document database 606. Though a single assistance document database 606 is shown in FIG. 6, in practice there may be multiple assistance document databases including an assistance document database for user of the data management system 102 and an assistance document database for support agents associated with the data management system 102.

The assistance document database can include assistance documents generated by experts associated with the data management system 102. Experts may receive questions from users and may generate an assistance document including the answer or explanation for the user's question. The expert may provide the assistance document to the user that asks a question, while also storing the assistance document in the assistance document database 606 for future reference by other users of the data management system 102.

The assistance document database 606 can include a social question-and-answer database. In a social question-and-answer database, each assistance document corresponds to a question or query provided by a user of the data management system 102. In the social question and answer database, the assistance documents include answers or solutions to a query made by a user that are provided by other users of the data management system 102.

In some cases, users of the data management system 102 may require additional assistance in resolving a question, concern, or problem related to the services provided by the data management system 102. Accordingly, the data management system 102 retains user support agents to help resolve the questions or concerns of the users. The support agents can include customer support personnel that receive phone calls, instant messages, or other communications from users of the data management system 102. The support agents assist the users to resolve their questions or problems.

The data management system 102 utilizes the support agent interface module 608 to enable support agents to provide support to users of the data management system 102. When the data management system 102 assigns a support agent to assist a user, the support agent can interface with the support agent interface module 608. When the support agent interfaces with the support agent interface module 608, the support agent interface module 608 enables support agents to search among the assistance document database 606. Support agents can search among the assistance document database 606 to find assistance documents that can help resolve the question or concern of the user. The support agents can search in the same assistance document database 606 that is accessed directly by the users, or the support agents can search in an assistance document database that is specific to support agents and not accessible by users directly.

The support agent interface module 608 provides agent interface content data 624 to the support agents as they work on support cases. The agent interface content data 624 can include data accessed by the support agents in resolving support cases. Accordingly, the agent interface content data 624 can include agent data related to the users, and assistance documents retrieved by the support agents to help resolve the concerns of the users.

The support agent computing environments 106 correspond to computing environments utilized by support agents to interface with the data management system 102 and/or to communicate with the user computing environments 104 using the communication networks 601. The support agent computing environments 106 include computing resources utilized by the support agents to access the data management system 102 in order to provide assistance to the users. The computing resources can include processing resources, memory resources, communication resources, and computing devices by which the support agents interface with the support agent interface module 608.

Though shown as separate from the data management system 102, the support agent computing environments 106 can be part of the data management system 102. In this case, the computing resources and devices utilized by the support agents can include computing devices and applications owned, controlled, or otherwise operated by the data management system 102.

The support case tracker 610 tracks, for each support case, the assistance documents that are accessed in the course of resolving the support case. When a user contacts a support agent, the support agent opens a support case. The support case is assigned an identification number. When the support agent accesses an assistance document in connection with the support case, the support case tracker writes data indicating that the assistance document was accessed in connection with the support case.

The support case tracker 610 generates support case data 626. The support case data 626 can include raw support case data listing the assistance documents accessed in each support case. The data management system 102 can utilize the support case data 626, as described herein, to generate groups of support cases.

The data management system 102 utilizes the analysis system 612 to analyze the support case data 626. The analysis system 612 receives the support case data 626 from the support case tracker 610. The analysis system 612 generates the support case matrix 300 from the support case data 626. In particular, the analysis system 612 arranges the support case data in rows and columns as described previously.

After the analysis system 612 has generated the support case matrix 300, the analysis system 612 generates the reduced matrix 126. In particular, the analysis system 612 performs a matrix reduction process on the support case matrix 300. The matrix reduction process results in a reduced matrix 400 that has fewer columns than did the support case matrix 300. The matrix reduction process can include a truncated singular value decomposition process, such as a latent semantic analysis process.

After the analysis system 612 has generated the reduced matrix 400, the analysis system 612 generates support case grouping data 500. In particular, the analysis system 612 performs a clustering process on the reduced matrix 400. The clustering process clusters or groups the support cases based on their respective row vectors in the reduced matrix 400.

As described previously, the support case groupings can indicate the major factors driving users to contact support agents. The groups of support cases that include the largest numbers of support cases are indicative of the factors that drive the most users to call support agents. In particular, the assistance documents or groups of assistance documents associated with the largest groups of support cases indicate the major driving factors for users to call support agents. The topics of these assistance documents that correspond to the major driving factors for users to contact support agents.

The data management system 102 can perform many useful actions based on the support case groupings. When the data management system 102 has determined the major factors that drive users to contact the user support agents, the data management system 102 can take steps to address those topics before users contact support agents. For example, the data management system 102 can provide better explanations, clearer instructions, or more obvious callouts to assistance documents related to those topics so that users will not become confused and contact support agents to request assistance regarding those topics.

In one example, after the analysis system 612 has generated support case grouping data 500, experts associated with the data management system 102 can investigate the support case grouping data 500. The experts can determine, based on sampling from each of the major groups of support cases, what are the specific topics associated with each group of support cases. The experts can identify and retrieve assistance documents that were accessed in those sampled support cases by referring back to the support case data 626 or the support case matrix 300.

In one example, the data management system 102 can automatically retrieve the titles of assistance documents associated with support cases sampled from each of the major groups of support cases. The data management system 102 can identify the topic of each group of support cases based on the titles of the assistance documents associated with the sampled support cases.

When the major drivers of support calls are understood based on the support case grouping data 500, experts can update the data management system 102 so it can more effectively provide data management services to the users. For example, the experts can adjust or generate interface content data 620 that more clearly provides explanations and assistance with regards to those topics that are driving users to contact support agents.

In one example, the data management system 102 is a bookkeeping system that assists users to manage financial data associated with their businesses. The bookkeeping system analyzes support case data 626 and generates support case grouping data 500. The bookkeeping system, or experts associated with the bookkeeping system, determine that the single largest factor driving users to contact support agents is questions regarding a particular aspect of creating invoices. Experts associated with the bookkeeping system can then revise the bookkeeping system to improve the experience and process of generating invoices. The experts can revise the bookkeeping system to provide clearer explanations, to simplify processes, or to otherwise provide users with better resources so that they can understand the invoice creation process well enough that they are less likely to contact support agents.

The data management system 102 includes computing resources 614. The computing resources 614 include processing resources 630 and memory resources 632. The processing resources 630 include one or more processors. The memory resources 632 include one or more memories configured as computer readable media capable of storing software instructions and other data. The processing resources 630 are capable of executing software instructions stored on the computer readable media. In one embodiment, the various components, modules, databases, and engines of the data management system utilize the computing resources 614 to assist in performing their various functions. Alternatively, or additionally, the various components, modules, databases, and engines can utilize other computing resources.

Figure 7:
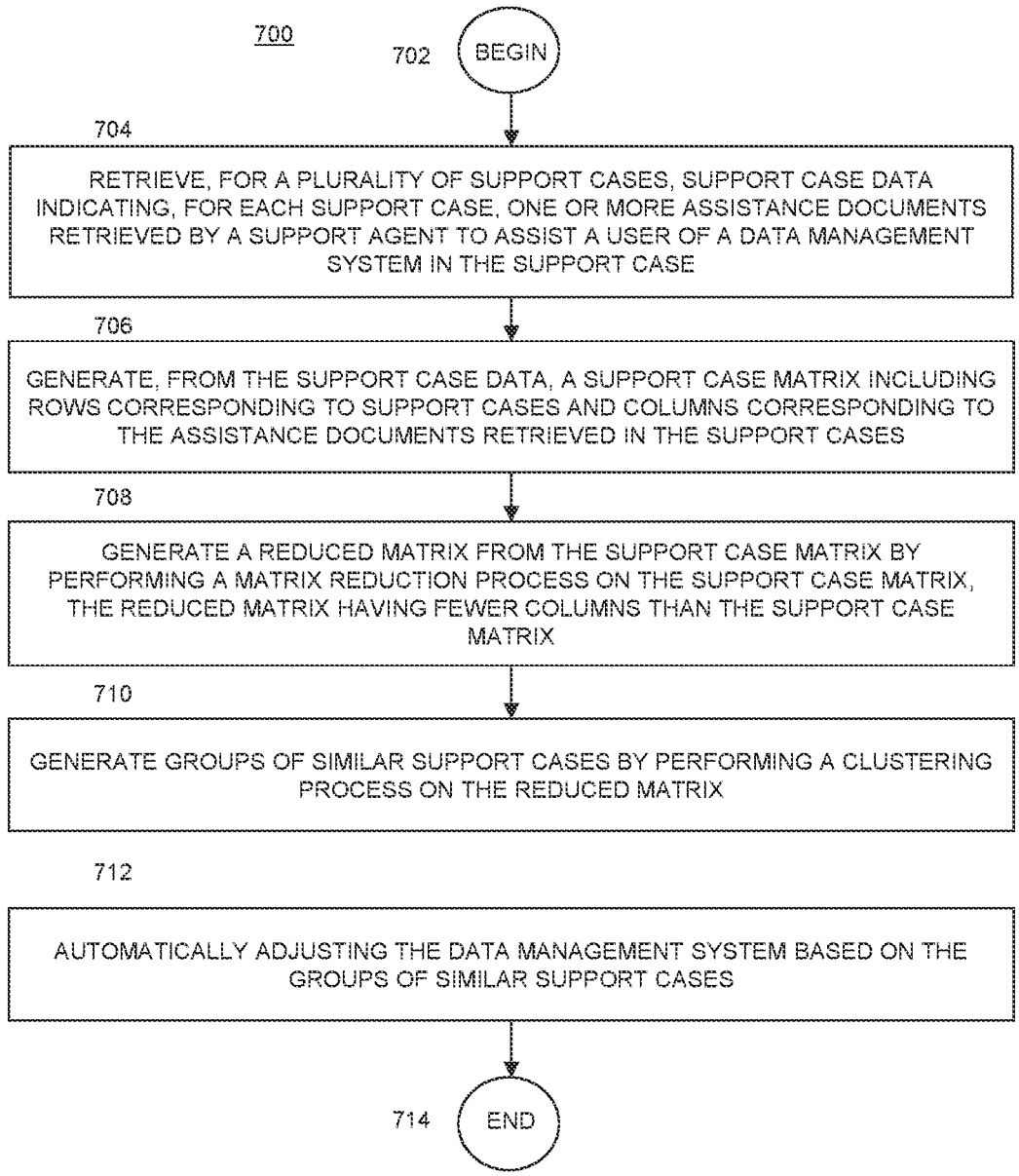
FIG. 7 illustrates a flow diagram of a process for grouping support cases in a data management system, according to an embodiment.

FIG. 7 illustrates a flow diagram of a process 700 for grouping support cases, in various embodiments.

Referring to FIG. 7, FIGS. 1-6, and the description of FIGS. 1-6 above, the process 700 begins at 702. From 702 process flow proceeds to 704.

At 704 support case data is retrieved, for a plurality of support cases, indicating, for each support case, one or more assistance documents retrieved by a support agent to assist a user of a data management system in the support case using any of the methods, processes, and procedures discussed above with respect to FIGS. 1-6. From block 704 process flow proceeds to block 706.

At 706 a support case matrix is generated, from the support case data, including rows corresponding to support cases and columns corresponding to the assistance documents retrieved in the support cases, using any of the methods, processes, and procedures discussed above with respect to FIGS. 1-6. From 706 process flow proceeds to 708.

At 708 a reduced matrix is generated from the support case matrix by performing a matrix reduction process on the support case matrix, the reduced matrix having fewer columns than the support case matrix, using any of the methods, processes, and procedures discussed above with respect to FIGS. 1-6. From 708 process flow proceeds to 710. From 708 process flow proceeds to 710.

At 710 groups of similar support cases are generated by performing a clustering process on the reduced matrix, using any of the methods, processes, and procedures discussed above with respect to FIGS. 1-6. From 710 process flow proceeds to 712.

At 712 the data management system is automatically adjusted based on the groups of similar support cases, using any of the methods, processes, and procedures discussed above with respect to FIGS. 1-6. From 712 process flow proceeds to 714.

At 714 the process 700 for grouping support cases is exited to await new data and/or instructions.

Figure 8:
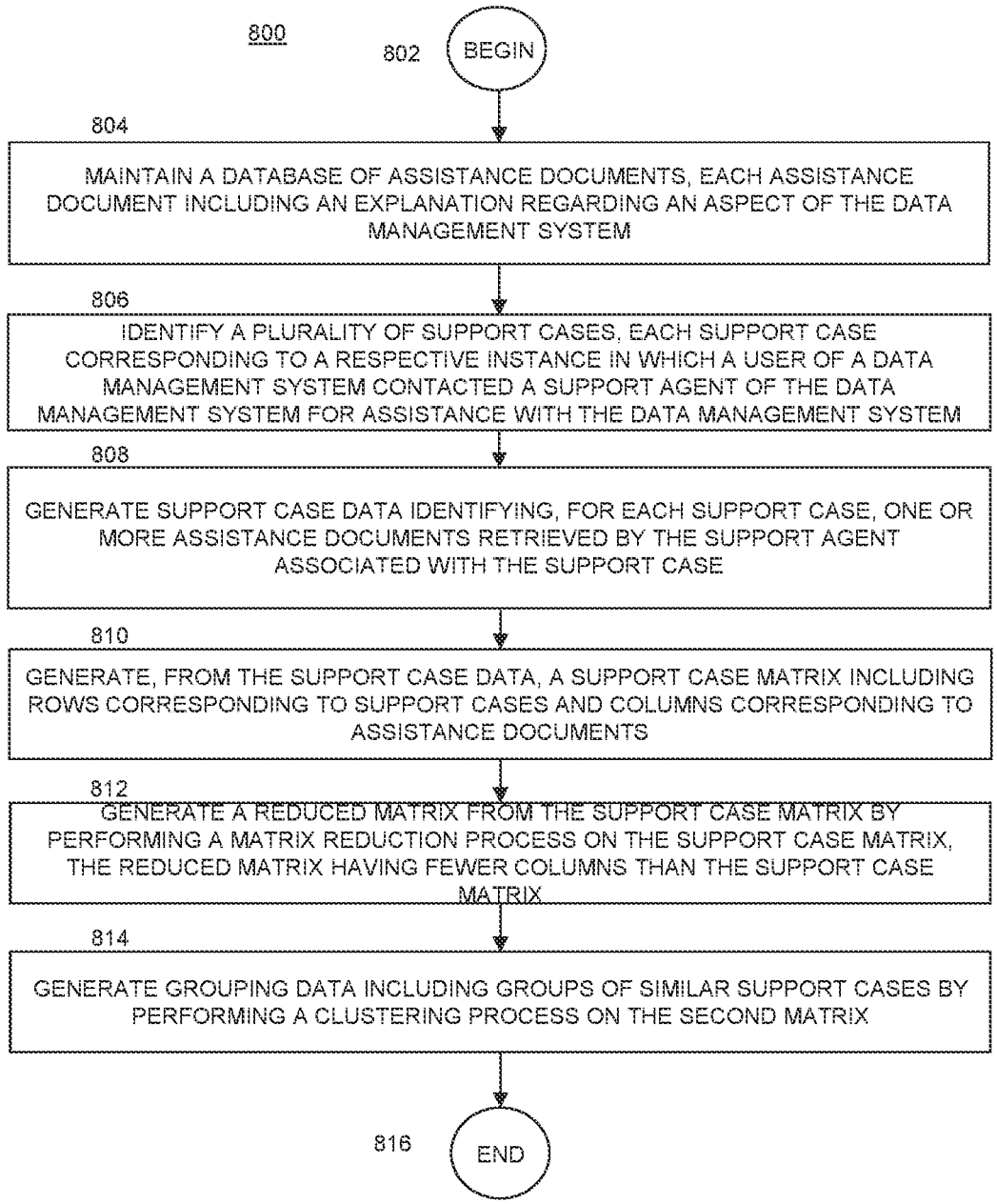
FIG. 8 illustrates a flow diagram of a process for grouping support cases in a data management system, according to an embodiment.

FIG. 8 illustrates a flow diagram of a process 800 for grouping support cases, in various embodiments.

Referring to FIG. 8, FIGS. 1-6, and the description of FIGS. 1-6 above, in one embodiment, process 800 begins at BEGIN 802 and process flow proceeds to 804.

At 804, a database of assistance documents is maintained, each assistance document including an explanation regarding an aspect of the data management system, using any of the methods, processes, and procedures discussed above with respect to FIGS. 1-6. From block 804 process flow proceeds to 806.

At 806, a plurality of support cases are identified, each support case corresponding to a respective instance in which a user of a data management system contacted a support agent of the data management system for assistance with the data management system, using any of the methods, processes, and procedures discussed above with respect to FIGS. 1-6. From 806 process flow proceeds to 808.

At 808, support case data is generated identifying, for each support case, one or more assistance documents retrieved by the support agent associated with the support case, using any of the methods, processes, and procedures discussed above with respect to FIGS. 1-6. From 808, process flow proceeds to 810.

At 810, a support case matrix is generated, from the support case data, including rows corresponding to support cases and columns corresponding to assistance documents, using any of the methods, processes, and procedures discussed above with respect to FIGS. 1-6. From 810 process flow proceeds to 812.

At 812, a reduced matrix is generated from the support case matrix by performing a matrix reduction process on the support case matrix, the reduced matrix having fewer columns than the support case matrix, using any of the methods, processes, and procedures discussed above with respect to FIGS. 1-6. From 812, process flow proceeds to 814.

At 814, grouping data is generated including groups of similar support cases by performing a clustering process on the second matrix, using any of the methods, processes, and procedures discussed above with respect to FIGS. 1-6. From 814 process flow proceeds to 816.

At 816 the process 800 for grouping support cases is exited to await new data and/or instructions.

In one embodiment, a method includes maintaining a database of assistance documents. Each assistance document includes an explanation regarding an aspect of the data management system. The method includes identifying a plurality of support cases. Each support case corresponds to a respective instance in which a user of a data management system contacted a support agent of the data management system for assistance with the data management system. The method includes generating support case data identifying, for each support case, one or more assistance documents retrieved by the support agent associated with the support case. The method includes generating, from the support case data, a support case matrix including rows corresponding to support cases and columns corresponding to assistance documents. The method includes generating a reduced matrix from the support case matrix by performing a matrix reduction process on the support case matrix, the reduced matrix having fewer columns than the support case matrix. The method includes generating grouping data including groups of similar support cases by performing a clustering process on the second matrix.

Grouping support cases based on assistance documents accessed in the support cases is a technical solution to a long-standing technical problem and is not an abstract idea for at least a few reasons. First, grouping support cases based on assistance documents accessed in the support cases is not an abstract idea because it is not merely an idea itself (e.g., can be performed mentally or using pen and paper). Second, grouping support cases based on assistance documents accessed in the support cases is not an abstract idea because it is not a fundamental economic practice (e.g., is not merely creating a contractual relationship, hedging, mitigating a settlement risk, etc.). Third, grouping support cases based on assistance documents accessed in the support cases is not an abstract idea because it is not a method of organizing human activity (e.g., managing a game of bingo). Fourth, although mathematics may be used in an analysis process the disclosed and claimed methods and systems of grouping support cases based on assistance documents accessed in the support cases are not an abstract idea because the methods and systems are not simply a mathematical relationship/formula.

Grouping support cases based on assistance documents accessed in the support cases yields significant improvement to the technical fields of electronic data management, user support, and data processing, according to one embodiment. The present disclosure adds significantly to the field of electronic data management because grouping support cases based on assistance documents accessed in the support cases increases the efficiency and accuracy with which data management systems can provide data management services to users.

The disclosed embodiments are able to generate groups of support cases without the need of performing textual analysis on the assistance documents. Likewise, the data management system is able to generate groups of support cases without performing analysis on notes kept by support agents for the cases. Such textual analysis often includes natural language processing and optical character recognition. These processes can be highly resource intensive in terms of processing and memory resources. The matrix generation, the matrix reduction, and the final matrix-based grouping of the support cases, as disclosed herein, are relatively inexpensive in terms of computing resources. Accordingly, the disclosed embodiments transforms computing systems into more efficient computing systems.

As noted above, the specific examples discussed above are but illustrative examples of implementations of embodiments of the method or process grouping support cases based on assistance documents accessed in the support cases. Those of skill in the art will readily recognize that other implementations and embodiments are possible. Therefore, the discussion above should not be construed as a limitation on the claims provided below. In addition, the operations shown in the FIG.s, or as discussed herein, are identified using a particular nomenclature for ease of description and understanding, but other nomenclature is often used in the art to identify equivalent operations. Therefore, numerous variations, whether explicitly provided for by the specification or implied by the specification or not, may be implemented by one of skill in the art in view of this disclosure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles and the novel features disclosed herein.

What is claimed is:

1. A method performed by one or more processors of a system, the method comprising:
retrieving case data indicating, for each respective case of a number of cases, one or more documents retrieved to assist a system user associated with the respective case;
generating, from the case data, a case matrix including a plurality of rows each corresponding to a respective case of the number of cases and a plurality of columns each corresponding to the documents retrieved to assist the system user associated with the respective case; and
identifying groups of similar cases among the plurality of cases based on a clustering process performed on at least a portion of the case matrix.

2. The method of claim 1, further comprising:
generating a reduced matrix from the case matrix based on a truncated singular value decomposition process including a latent semantic analysis process, wherein the clustering process is performed on the reduced matrix.

3. The method of claim 2, wherein the reduced matrix has a same number of rows as the case matrix, and wherein the reduced matrix has fewer columns than the case matrix.

4. The method of claim 2, wherein each row of the reduced matrix corresponds to a respective case of the plurality of cases.

5. The method of claim 4, wherein each row of the reduced matrix is a vector representing the respective case corresponding to the row.

6. The method of claim 1, wherein the clustering process groups cases based on vector similarity.

7. The method of claim 6, wherein the clustering process includes at least one of an agglomerative clustering process or performing cosine similarity calculations on vectors.

8. The method of claim 1, further comprising:
maintaining a database including the one or more documents, wherein each of the one or more documents includes information about the system, and wherein the one or more documents are retrieved from the database by system agents to assist system users.

9. The method of claim 1, further comprising:
identifying one or more common topics associated with the groups of similar cases.

10. The method of claim 9, further comprising:
adjusting a system user experience based on the one or more common topics.

11. A system comprising:
one or more processors; and
at least one memory coupled to the one or more processors and storing instructions that, when executed by the one or more processors, cause the system to perform operations including:
retrieving case data indicating, for each respective case of a number of cases, one or more documents retrieved to assist a system user associated with the respective case;
generating, from the case data, a case matrix including a plurality of rows each corresponding to a respective case of the number of cases and a plurality of columns each corresponding to the documents retrieved to assist the system user associated with the respective case; and
identifying groups of similar cases among the plurality of cases based on a clustering process performed on at least a portion of the case matrix.

12. The system of claim 11, wherein execution of the instructions causes the system to perform operations further including:
generating a reduced matrix from the case matrix based on a truncated singular value decomposition process including a latent semantic analysis process, wherein the clustering process is performed on the reduced matrix.

13. The system of claim 12, wherein the reduced matrix has a same number of rows as the case matrix, and wherein the reduced matrix has fewer columns than the case matrix.

14. The system of claim 12, wherein each row of the reduced matrix corresponds to a respective case of the plurality of cases.

15. The system of claim 14, wherein each row of the reduced matrix is a vector representing the respective case corresponding to the row.

16. The system of claim 11, wherein the clustering process groups cases based on vector similarity.

17. The system of claim 16, wherein the clustering process includes at least one of an agglomerative clustering process or performing cosine similarity calculations on vectors.

18. The system of claim 11, wherein execution of the instructions causes the system to perform operations further including:
maintaining a database including the one or more documents, wherein each of the one or more documents includes information about the system, and wherein the one or more documents are retrieved from the database by system agents to assist system users.

19. The system of claim 11, wherein execution of the instructions causes the system to perform operations further including:
identifying one or more common topics associated with the groups of similar cases; and
adjusting a system user experience based on the one or more common topics.

20. A non-transitory computer-readable medium storing instructions that, when executed by one or more processors of a system, cause the system to perform operations including:
retrieving case data indicating, for each respective case of a number of cases, one or more documents retrieved to assist a system user associated with the respective case;
generating, from the case data, a case matrix including a plurality of rows each corresponding to a respective case of the number of cases and a plurality of columns each corresponding to the documents retrieved to assist the system user associated with the respective case; and
identifying groups of similar cases among the plurality of cases based on a clustering process performed on at least a portion of the case matrix.

* * * * *